(12) United States Patent
Reiss, Jr.

(10) Patent No.: US 10,226,721 B2
(45) Date of Patent: Mar. 12, 2019

(54) TRASH RAKE SYSTEM WITH ARTICULATED RAKE HEAD ASSEMBLY

(71) Applicant: Thomas J. Reiss, Jr., Ixonia, WI (US)

(72) Inventor: Thomas J. Reiss, Jr., Ixonia, WI (US)

(73) Assignee: Hydro Component Systems, LLC, Watertown, WI (US)

( * ) Notice: Subject to any disclaimer, the term of this patent is extended or adjusted under 35 U.S.C. 154(b) by 16 days.

(21) Appl. No.: 15/398,494

(22) Filed: Jan. 4, 2017

(65) Prior Publication Data

US 2017/0189835 A1 Jul. 6, 2017

Related U.S. Application Data

(60) Provisional application No. 62/274,874, filed on Jan. 5, 2016.

(51) Int. Cl.
| | | |
|---|---|---|
| *E02B 8/02* | (2006.01) | |
| *E03F 5/14* | (2006.01) | |
| *B01D 29/64* | (2006.01) | |
| *B01D 29/44* | (2006.01) | |

(52) U.S. Cl.
CPC ....... *B01D 29/6484* (2013.01); *B01D 29/445* (2013.01); *E02B 8/026* (2013.01); *E03F 5/14* (2013.01)

(58) Field of Classification Search
CPC . E02B 8/026; E02B 5/085; E03F 5/14; B01D 29/445; B01D 29/6484; B01D 29/6492
USPC ........................................ 210/159, 162, 413
See application file for complete search history.

(56) References Cited

U.S. PATENT DOCUMENTS

| | | | | |
|---|---|---|---|---|
| 1,357,499 | A | * 11/1920 | Hunt ................ | E02B 8/026 210/162 |
| 2,866,555 | A | 12/1958 | Nordell | |
| 2,904,181 | A | * 9/1959 | Baker ............... | E02B 8/026 210/159 |
| 3,193,104 | A | 7/1965 | Leach | |
| 3,482,698 | A | 12/1969 | Ostnas | |
| 3,909,411 | A | 9/1975 | Angele et al. | |

(Continued)

FOREIGN PATENT DOCUMENTS

| | | |
|---|---|---|
| DE | 2304600 | * 10/1974 |
| DE | 2655153 | * 6/1978 |

(Continued)

OTHER PUBLICATIONS

Machine translation of DE 2304600, Oct. 1974.*

(Continued)

*Primary Examiner* — Christopher Upton
(74) *Attorney, Agent, or Firm* — Reinhart Boerner Van Deuren P.C.

(57) ABSTRACT

A trash rake system with an articulated rake head assembly is provided. The trash rake system includes a main unit, a telescoping boom attached to the main unit, and a rake head assembly attached to an end of the telescoping boom. The rake head assembly includes a base frame, a drive arrangement mounted to the base frame, and a rake head mounted to the drive arrangement. The drive arrangement includes at least one gear arranged to mesh with a rack gear mounted to a rack which is in turn mounted between a fixed member and a movable member of the telescoping boom.

18 Claims, 6 Drawing Sheets

(56) References Cited

U.S. PATENT DOCUMENTS

| | | |
|---|---|---|
| 4,138,334 A | 2/1979 | Rimmele |
| 4,214,989 A | 7/1980 | Rudolph et al. |
| 4,218,319 A | 8/1980 | Hansson |
| 4,222,878 A | 9/1980 | Hansson |
| 4,396,511 A * | 8/1983 | Neumann ............... E02B 8/026 |
| | | 210/159 |
| 4,447,323 A | 5/1984 | Jackson |
| 4,792,394 A | 12/1988 | Rudzinski |
| 4,846,966 A | 7/1989 | Pastore |
| 4,857,182 A | 8/1989 | Jackson |
| 5,074,996 A | 12/1991 | Galanty et al. |
| 5,098,561 A | 3/1992 | Grabbe |
| 5,167,803 A | 12/1992 | Newton et al. |
| 5,246,573 A | 9/1993 | Lodholz et al. |
| 5,571,406 A | 11/1996 | Mensching |
| 5,718,771 A | 2/1998 | Cassell et al. |
| 5,968,350 A | 10/1999 | Davignon |
| 6,016,920 A | 1/2000 | Brauch et al. |
| 6,129,215 A | 10/2000 | Brauch et al. |
| 6,913,690 B2 * | 7/2005 | Mattox ................... E02B 8/026 |
| | | 210/159 |
| 7,815,811 B1 | 10/2010 | Reiss, Jr. |
| 9,539,528 B2 | 1/2017 | Reiss, Jr. |
| 2007/0125691 A1 | 6/2007 | Reiss, Jr. |
| 2007/0187119 A1 | 8/2007 | Fawcett |
| 2009/0095190 A1 | 4/2009 | Gordon |
| 2016/0194845 A1 * | 7/2016 | Haak ....................... E02B 8/026 |
| | | 414/800 |

FOREIGN PATENT DOCUMENTS

| | | |
|---|---|---|
| KR | 20 0239062 | 10/2001 |
| KR | 20 0323134 | 8/2003 |
| KR | 10 0540219 | 1/2006 |

OTHER PUBLICATIONS

Machine translation of DE 2655153, Jun. 1978.*
Wahl et al, "Trash rack Cleaning Alternatives for Parker Dam Powerplant Forebay Inlet Trash rack Structure" U.S. Department of the Interior, 2008, pp. 1-27.
International Water Power, "Cleaning up—world's largest trash rack cleaning system" 2009, Feb. 10, 2015, pp. 1-3.

* cited by examiner

TRASH RAKE SYSTEM WITH ARTICULATED RAKE HEAD ASSEMBLY

CROSS-REFERENCE TO RELATED PATENT APPLICATION

This patent application claims the benefit of U.S. Provisional Patent Application No. 62/274,874, filed Jan. 5, 2016, the entire teachings and disclosure of which are incorporated herein by reference thereto.

FIELD OF THE INVENTION

This invention pertains generally to trash rakes and other devices and systems for clearing debris from intake screens or racks that are used to prevent debris from entering into systems and facilities that intake water from exposed above-ground water sources such as rivers, lakes, oceans and the like.

BACKGROUND OF THE INVENTION

Various systems and facilities intake large quantities of water from various exposed natural and other above-ground water sources, such as rivers, lakes, oceans, reservoirs, irrigation and flood water canals, outdoor water parks, other water conveyance structures, and the like. Examples of such systems and facilities include hydroelectric plants, pulp and paper mills, steel mills, petro-chemical plants, municipal water systems and waste water plants, nuclear and other energy facilities that use the water for cooling or for other purposes, other water filtering or screening facilities, etc. In all such systems it is important to screen naturally occurring debris and refuse, i.e. trash, found in the exposed above-ground water source from the flow of water that is taken into and employed by the system or facility.

Various screening systems are known and used for preventing debris found in exposed above-ground water sources from entering into the systems or facilities described above. An exemplary screening system of this type is known as an intake rack system or trash rack. Intake rack systems typically provide screening using a series of vertically oriented parallel blades separated by spacers and mounted on horizontally oriented rods. The spacing between the blades forming the intake rack is selected to screen debris of the desired size from entering the water intake of the system or facility that the trash rack is protecting, without significantly reducing water flow into the water intake. Such intake racks may be made of metallic or non-metallic materials. Intake racks of this type are available, for example, from Hydro Component Systems, LLC of Watertown, Wis. and covered by U.S. Pat. No. 7,815,811, incorporated by reference herein in its entirety.

As an intake rack or other screening structure prevents the flow of debris into the water intake of a system or facility from an exposed above-ground water source, the debris being screened will build up on the intake rack or other screening structure. This accumulating debris must be cleared from the intake rack or other screening structure on a regular basis, to prevent the buildup of such debris from interfering with the flow of water into the system or facility water intake.

A typical tool for removing accumulated debris from an intake rack is known as a trash rake. A typical trash rake can include a rake-like structure including tines that are spaced apart so as to fit between the blades of an intake rack to be cleaned. This rake-like structure is positioned adjacent to and drawn vertically along the intake rack blades to remove accumulated debris therefrom.

Such trash rake systems typically include a main unit which is positioned above the intake rack and movable relative thereto on tracks or the like. A telescoping boom assembly is mounted to the main unit. A rake head assembly is attached to an end of the telescoping boom. The telescoping boom moves the rake head assembly vertically along the rack system to rake up and collect the debris trapped thereon. The boom is also movable relative to the main unit to position the rake head assembly over a conveyor or other collection structure so that trash collected by the rake head assembly may be dumped onto the collection structure. An exemplary embodiment of such a trash rake system may be readily seen at U.S. Pat. No. 7,815,811 incorporated by reference above.

This dumping operation typically involves rotating the rake head assembly relative to the telescoping boom to dump trash collected by the rake. The applicant herein, however, has discovered several problems with this existing dumping operation, and particularly the mechanism responsible for manipulating the rake head assembly to achieve the dumping operation.

More specifically, the dumping operation is typically effectuated by use of hydraulics, in a similar fashion as the hydraulic manipulation of a bucket on an excavator or the like. Alternatively, complex cable driven or gravity driven mechanisms may also be utilized. The particular use of hydraulics, however, may lead to inadvertent contamination of the water within which the trash rake operates in the event of a hydraulic fluid leak. Further, the hydraulics are specifically needed just for the dumping operation, thereby driving up the cost and complexity of the system. Further still, the cable or gravity driven mechanisms are also complex in their design.

Yet further, such existing systems suffer from the problem of residual trash entrapment behind the rake head assembly after it has rotated to dump the trash within the rake head assembly. This residual trash must be manually cleared away from behind the rake head assembly to allow it to rotate back to its working, non-dumping orientation.

Yet further, such existing systems have a generally limited range of motion with respect to their rake head assembly. That is, the rake head assembly may only rotate between about zero and less than ninety degrees about its axis of rotation when conducting the above described dumping operation. This limited range of rotation undesirably prevents all of the trash from falling out of the rake head assembly during the dumping operation. This residual trash left within the rake head assembly must also be manually removed therefrom.

Accordingly, there is a need in the art for a trash rake system which employs a rake head assembly which overcomes the problems identified above. Specifically, there is a need in the art for a trash rake system which employs a rake head assembly which employs a drive mechanism which provides a low risk of water contamination, a high degree of angular articulation, and a reduction or elimination of the need to manually remove residual trash as identified above. The invention provides such a trash rake system. These and other advantages of the invention, as well as additional inventive features, will be apparent from the description of the invention provided herein.

BRIEF SUMMARY OF THE INVENTION

In one aspect, the invention provides a rake head assembly which advantageously overcomes existing problems in the art by permitting a high degree of articulation so as to ensure that trash contained within the rake head assembly is removed during a dumping operation. This aspect of the invention advantageously allows for a reduction or an entire elimination of the above-referenced manual cleaning operations which are otherwise necessary by existing devices. An embodiment of a rake head assembly according to this aspect includes a base frame and a rake head. A drive arrangement is mounted to the base frame. The rake head is mounted to the drive arrangement. The drive arrangement is configured to rotate the rake head about a drive axis defined by a drive shaft of the drive arrangement between a working configuration and a dumping configuration. The rake head is rotatable about the drive axis such that an angular displacement of the rake head about the drive axis moving from the working configuration to the dumping configuration is greater than 90°.

In embodiments according to this aspect, the rake head includes a center member and a pair of side members. The pair of side members are mounted to the drive shaft or the drive arrangement. The side members and center member are supported by a plurality of support bars. The plurality of support bars are arranged in a parallel configuration relative to the drive shaft.

In embodiments according to this aspect, the drive arrangement includes at least one gear mechanically coupled to the drive shaft. The at least one gear may include a pinion gear, a first intermediary gear, a second intermediary gear, and a drive gear. The pinion gear is in meshed contact with the first intermediary gear. The second intermediary gear is in meshed contact with the first intermediary gear. The drive gear is in meshed contact with the second intermediary gear. The pinion gear is positioned within an opening of the base frame such that it is arranged to mesh with a rack gear.

In embodiments according to this aspect, the rake head assembly also includes a locking arrangement for locking the drive arrangement in a fixed position such that rotation of the rake head about the drive axis is prevented. The locking arrangement includes a rotatable locking arm. A portion of the rotatable locking arm is configured to selectively engage at least one gear of the drive arrangement.

In another aspect, the invention provides a rake head assembly which overcomes existing problems in the art by providing a drive arrangement which utilizes a rack and pinion configuration as opposed to conventionally used hydraulics or other complex mechanisms. Such a configuration advantageously avoids the above-mentioned contamination problem and also provides for a reduction in cost and complexity of the rake head assembly as the additional hydraulic system or other complex mechanism is not required. Further, the use of such a geared rack and pinion configuration provides for a self-cleaning mechanism, as the forces exerted by the mechanism are strong enough to readily crush and remove any trash collected therein. An embodiment of a rake head assembly according to this aspect includes a base frame and a rake head. A drive arrangement is mounted to the base frame. The rake head is mounted to the drive arrangement. The drive arrangement is configured to rotate the rake head about a drive axis defined by a drive shaft of the drive arrangement between a working configuration and a dumping configuration. The drive arrangement includes at least one gear mechanically connected to the drive shaft such that rotation of the at least one gear results in rotation of the rake head about the drive axis.

In embodiments according to this aspect, the rake head is rotatable about the drive axis such that an angular displacement of the rake head about the drive axis moving from a working configuration to a dumping configuration is greater than 90°. The at least one gear may include a pinion gear, a first intermediary gear, a second intermediary gear and a drive gear. The pinion gear is in meshed contact with the first intermediary gear. The second intermediary gear is in meshed contact with the first intermediary gear. The drive gear is in meshed contact with the second intermediary gear. The pinion gear is positioned within an opening of the base frame such that it is arranged to mesh with a rack gear.

In yet another aspect, the invention provides a trash rake system which overcomes existing problems by utilizing a drive mechanism which advantageously takes advantage of existing energy of the system to articulate a rake head assembly of the trash rake system. The invention thus provides an improvement over existing trash rake systems which typically incorporate a separate hydraulic system for the articulation of their respective rake head assemblies as discussed above. An embodiment of a trash rake system according to this aspect includes a main unit. A telescoping boom is mounted to the main unit. The telescoping boom includes a fixed member and a movable member. The movable member is received by the fixed member and movable relative thereto. A rake head assembly is mounted to an end of the telescoping boom. The rake head assembly includes a rake head rotatable about a drive axis. The rake head assembly includes a drive arrangement mechanically coupled to the rake head and configured for rotating the rake head about the drive axis. A rack is mounted to the fixed member and extends into the rake head assembly. The rack includes a rack gear. Movement of the movable member relative to the fixed member selectively couples and decouples the rack gear from the drive arrangement.

In embodiments according to this aspect, the drive arrangement includes at least one gear in meshed contact with the rack gear. The at least one gear includes a pinion gear, a first intermediary gear, a second intermediary gear, and a drive gear. The pinion gear is in meshed contact with the first intermediary gear. The second intermediary gear is in meshed contact with the first intermediary gear. The drive gear is in meshed contact with the second intermediary gear. The pinion gear is in meshed contact with the rack gear.

In embodiments according to this aspect, the rake head is rotatable about the drive axis such that an angular displacement of the rake head about the drive axis moving from a working configuration to a dumping configuration is greater than 90°.

In embodiments according to this aspect, the rake head is rotatable about the drive axis such that an angular displacement of the rake head about the drive axis moving from a working configuration to a dumping configuration is from 120° to 180°.

In embodiments according to this aspect, the rake head assembly further comprises a locking arrangement for selectively preventing rotation of at least one gear of the drive arrangement.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
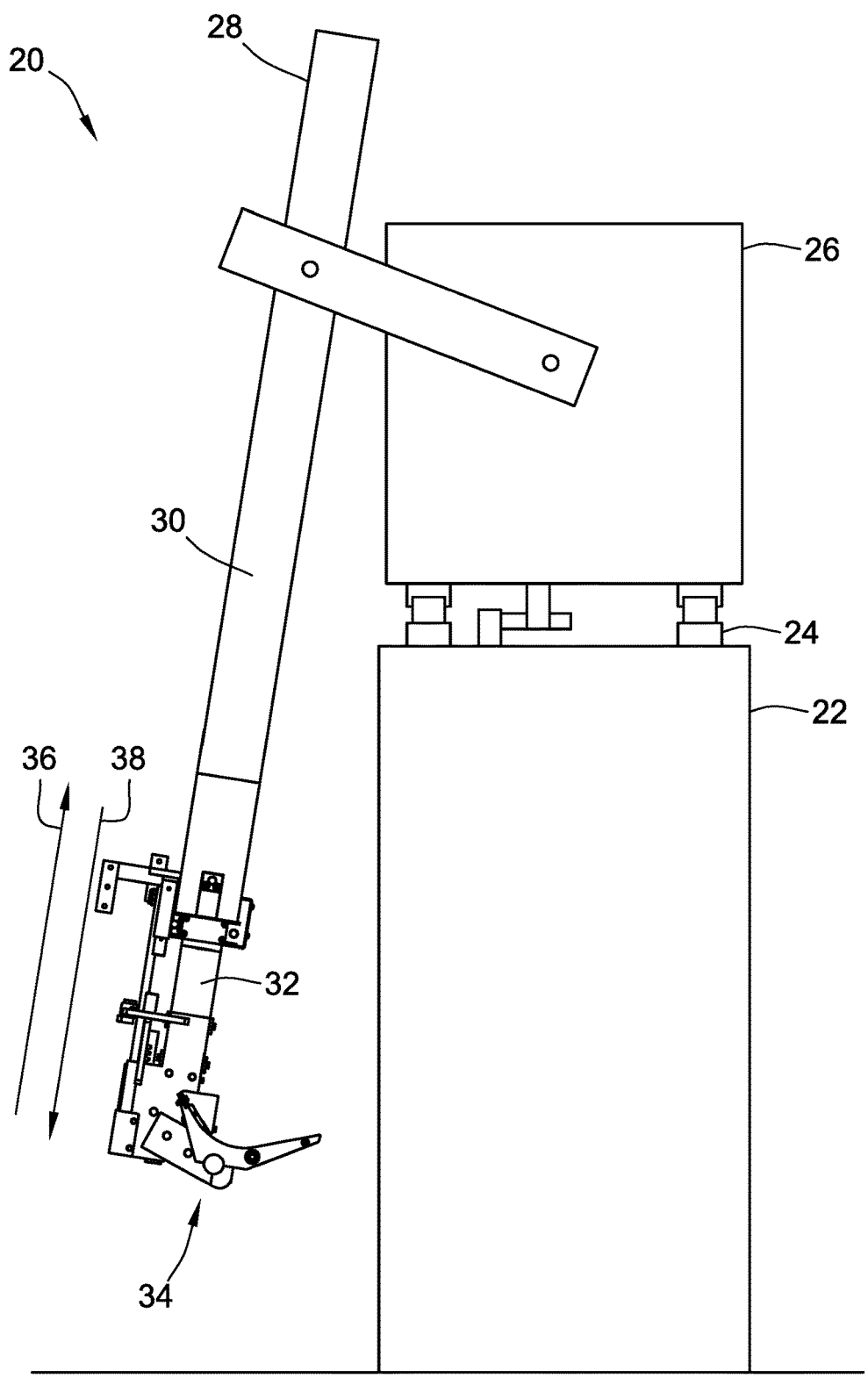
FIG. 1 is a side view of an exemplary embodiment of a trash rake system according to the teachings of the invention.

Turning now to the drawings, FIGS. 1-7 illustrate an exemplary embodiment of a trash rake system incorporating a rake head assembly according to the teachings of the present invention. With particular reference to FIG. 1, trash rake system 20 is shown generally schematically. As can be seen therein, trash rake system 20 is mounted on a structure 22 and is movable relative thereto. Structure 22 may be any of the above-identified exemplary structures such as dams or the like that include a rack system for the collection of debris flowing in a waterway. Trash rake system 20 is movable along structure 22 by way of tracks 24 which are mounted on structure 22.

Trash rake system 20 includes a main unit 26 which is responsible for moving trash rake system 20 along tracks 24. Accordingly, main unit 26 includes an appropriate drive mechanism for conveying main unit 26 along tracks 24. One example of such a drive unit may be seen at U.S. patent application Ser. No. 13/546,783 titled "Rack and Pinion Drive for Trash Rake" to Reiss, the teachings and disclosure of which are incorporated by reference herein. A telescoping boom 28 is also attached to main unit 26. Telescoping boom 28 is movable relative to main unit 26. Main unit 26 incorporates appropriate mechanisms for articulating telescoping boom assembly 28. Examples of such articulation mechanisms may be readily found at those references incorporated by reference herein.

Telescoping boom assembly 28 includes a fixed member 30 and a movable member 32 which is telescopically movable relative to fixed member 30 in linear directions 36, 38 as illustrated. Such telescopic movement may be achieved by a system of pulleys and cables and an appropriate motor mounted as generally described in those references incorporated herein. A rake head assembly 34 is attached to an end of movable member 32. Accordingly, movement of movable member 32 in linear directions 36, 38 also results in movement of rake head assembly 34 in linear directions 36, 38.

Figure 2:
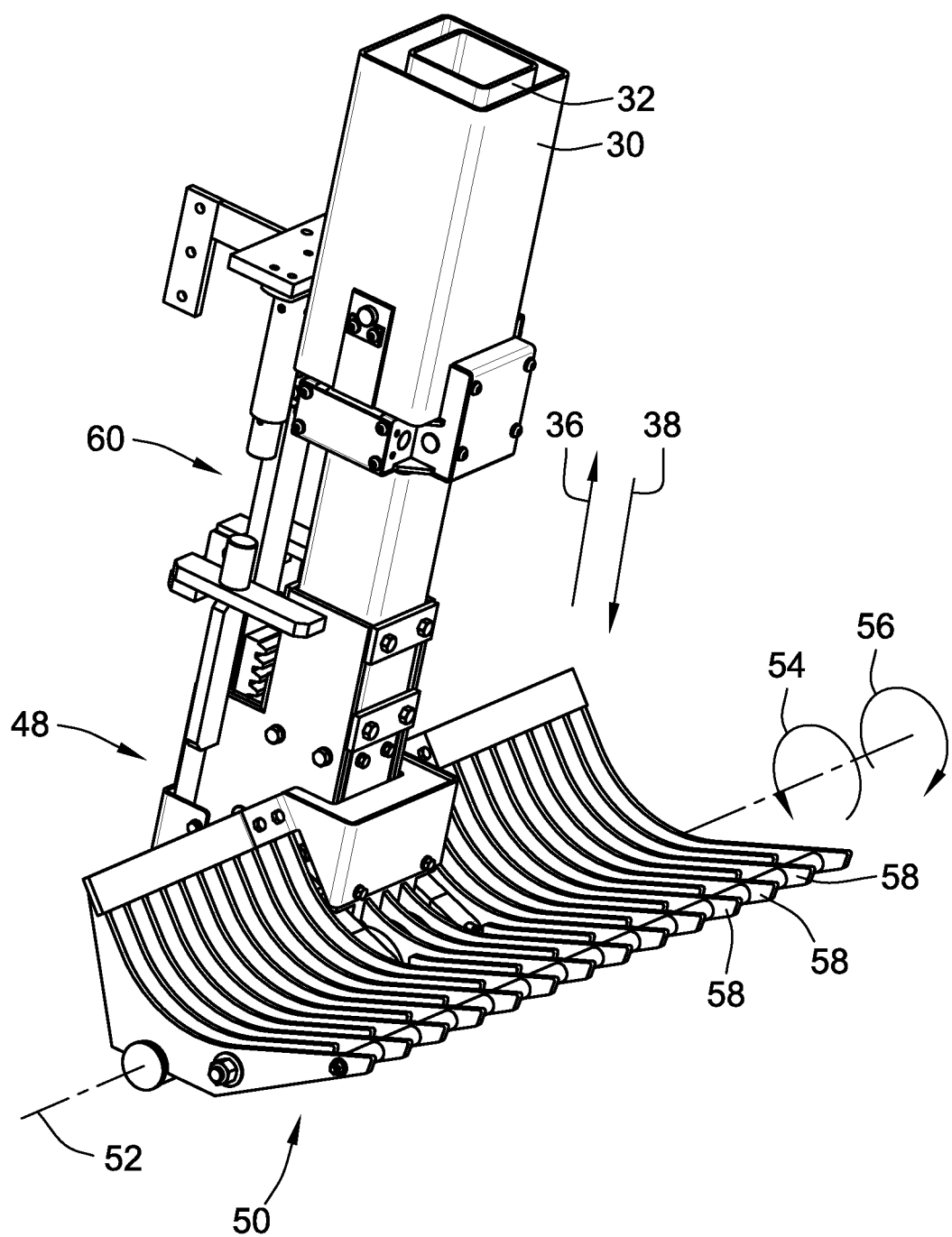
FIG. 2 is a perspective view of a rake head assembly of the trash rake system of FIG. 1.
Figure 7:
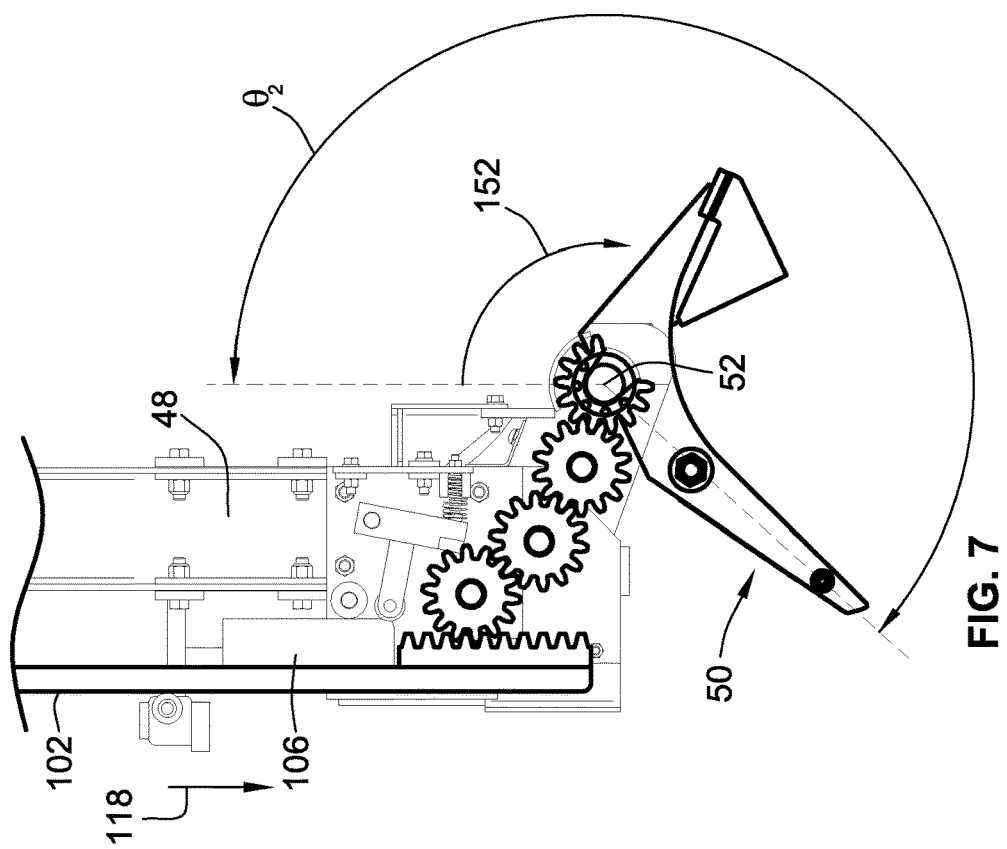
FIG. 6 is a side view of the rake head assembly in a raking configuration thereof and FIG. 7 is a side view of the rake head assembly in a dumping configuration thereof.

Turning now to FIG. 2, the same illustrates a prospective view of rake head assembly 34. Rake head assembly 34 includes a base frame 48 and a rake head 50. As will be described in greater detail below, rake head 50 is rotatable about drive axis 52 in rotational directions 54, 56 between a working configuration as shown in FIG. 2, and a dumping configuration as shown in FIG. 7 and described in greater detail below. As will also be described in greater detail below, the angular displacement of rake head 50 about drive axis 52 between the aforementioned configurations is significantly greater than existing designs. Such a configuration thus advantageously allows for the efficient removal of trash during a dumping operation. This configuration advantageously reduces or entirely eliminates the need to manually remove residual trash from rake head 50, or from behind rake head 50 as is otherwise present in existing designs as described above.

Still referring to FIG. 2, rake head 50 includes a plurality of tines 58 which aid in the removal of trash. It should be noted that the particular number and arrangement of tines 58 illustrated is exemplary. In other embodiments, greater or fewer tines 58 may be utilized, or the tines may be omitted entirely in favor of a shovel-like rake head 50.

As can also be seen in FIG. 2, a rack 60 is fixed to the exterior of fixed member 30 and extends to an interior of base frame 48 of rake head assembly 34. Because rack 60 is fixed to fixed member 30, movement of movable member 32 in linear directions 36, 38 also results in the movement of rack 60 relative to rake head assembly 34.

Figure 3:
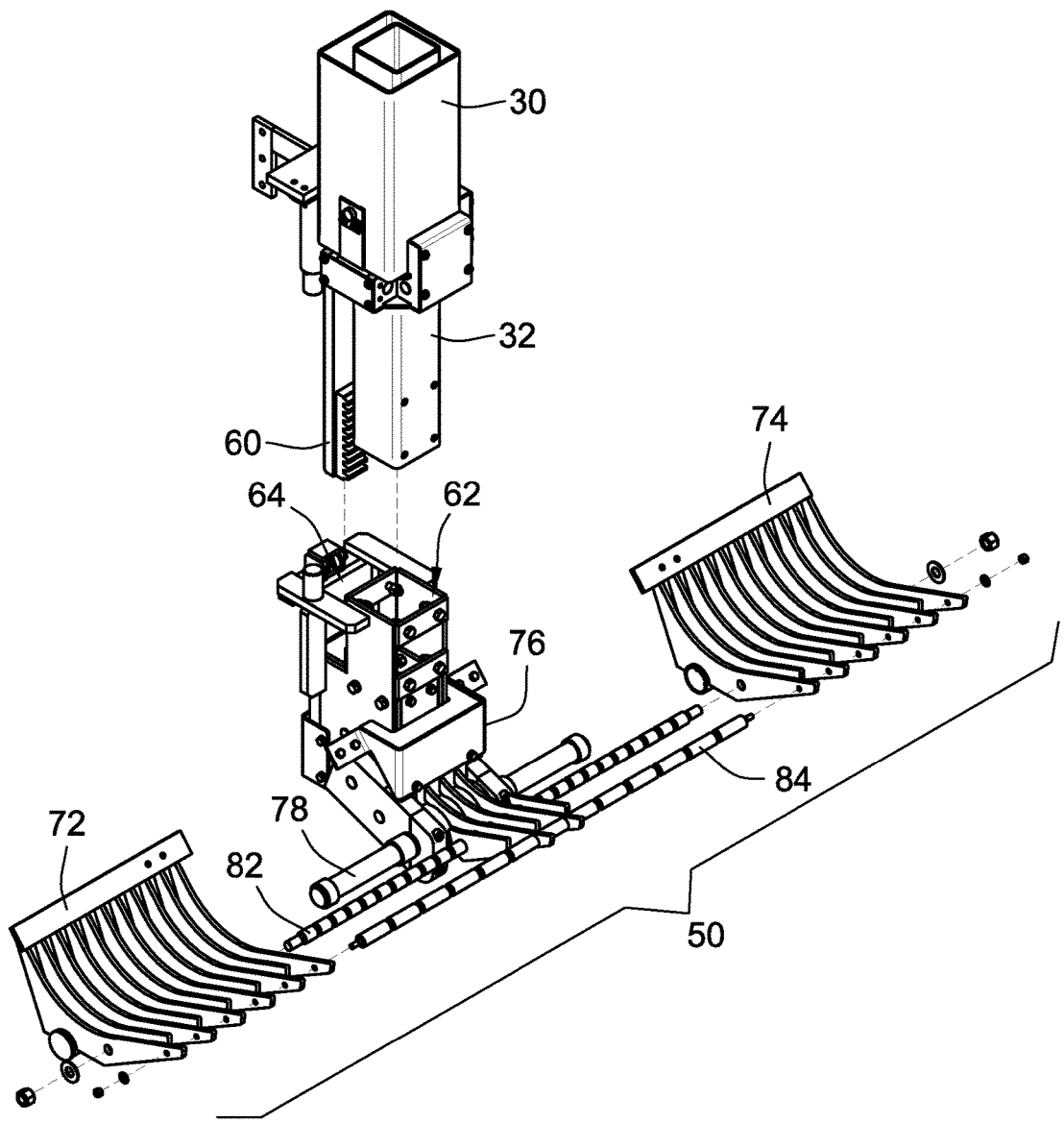
FIG. 3 is an exploded view of the rake head assembly of FIG. 2.

Turning now to FIG. 3, rake head assembly 34 is illustrated in an exploded view. As can be seen therein, movable member 32 extends into a first opening 62 in base frame 48. Rack 60 extends into a second opening 64 of base frame 48. Both first and second opening 62, 64 are generally parallel to one another as shown.

Rake head 50 includes a pair of side members 72, 74 and a center member 76 interposed between side members 72, 74. Side members 72, 74 are mounted to a rotatable drive shaft 78 of a drive arrangement 90 (See FIG. 4) which will be described in greater detail below. A pair of support rods 82, 84 support each of side members 72, 74 and center member 76. Center member 76 is not itself mounted to drive shaft 78. Instead, center member 76 is connected to side members 72, 74 directly and also connected to side members 72, 74 indirectly by way of support rods 82, 84.

Side members 72, 74 are mounted to drive shaft 78 in such a way that they cannot rotate relative to drive shaft 78. As a result, any rotation of drive shaft 78 also results in a rotation of side members 72, 74 about drive axis 52 (See FIG. 2). Additionally, due to the connection of center member 76 to side members 72, 74 center member 76 also rotates about drive axis 52 with side members 72, 74. As such, side members 72, 74 and center member 76 rotate in unison as a singular unit about drive axis 52.

Figure 4:
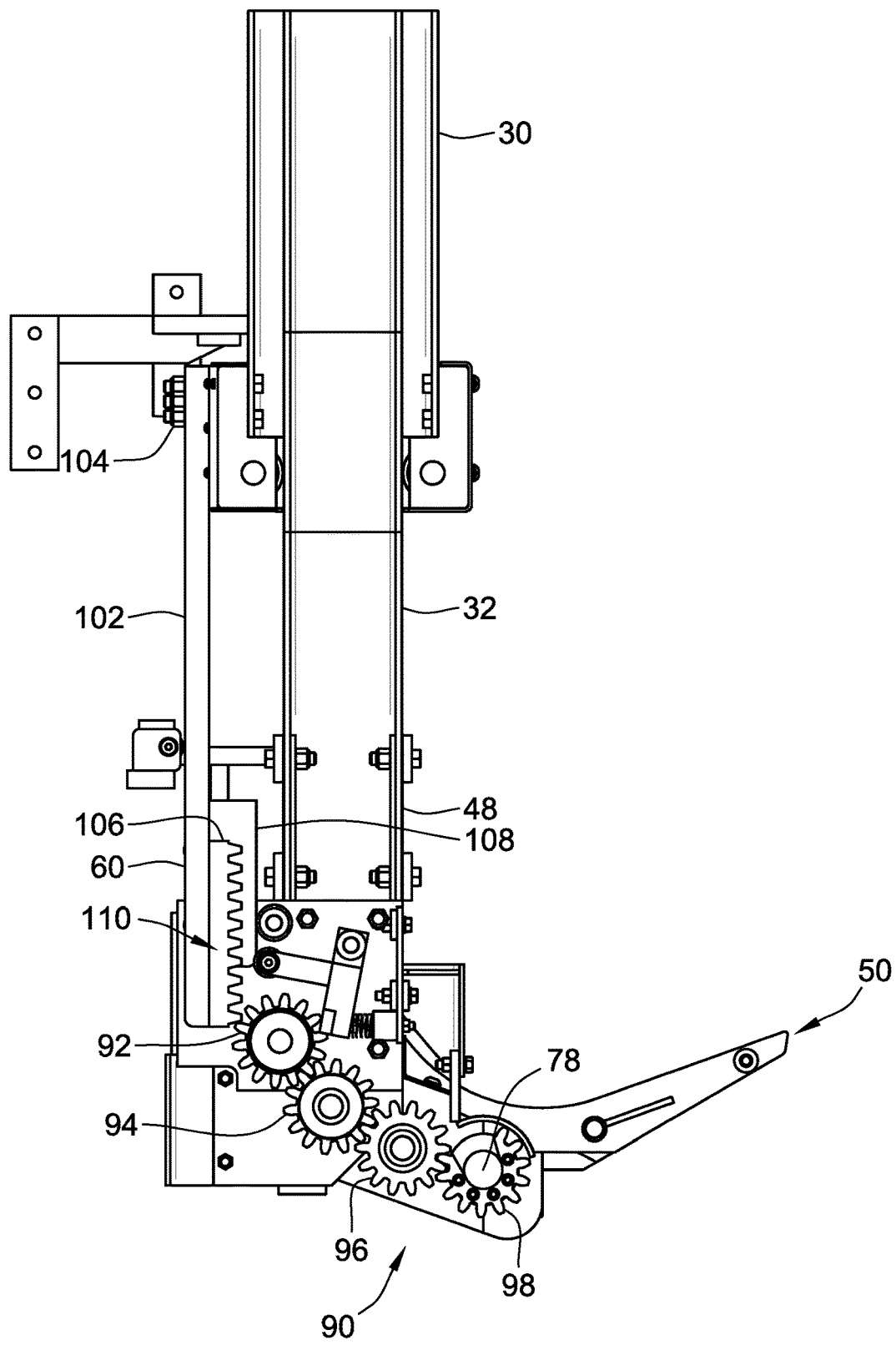
FIG. 4 is a side cross section of the rake head assembly of FIG. 2.

Turning now to FIG. 4, a cross-section of rake head assembly 34 is illustrated. As can be seen on this cross-section, drive arrangement 90 is exposed and will be described in greater detail in the following. Drive arrangement 90 includes at least one gear that meshes with a rack of rack 60. In the illustrated embodiment, drive arrangement 90 utilizes four gears. Specifically, drive arrangement 90 includes a pinion gear 92 which is in meshed contact with a rack gear 106 of rack 60, and in meshed contact with a first intermediary gear 94 of drive arrangement 90. First intermediary gear 94 is in meshed contact with second intermediary gear 96. Second intermediary gear 96 is in meshed contact with drive gear 98. Drive gear 98 is mounted to drive shaft 78 in a fixed manner such that it cannot rotate relative to drive shaft 78. As a result, any rotation of drive gear 98 also results in a corresponding rotation of drive shaft 78 about drive axis 52 (See FIG. 2).

As movable member 32 moves in linear direction 36, rack gear 106 of rack 60 is brought into meshed contact with pinion gear 92 and rotates the same. This results in corresponding rotations of first and second intermediary gears 94, 96, as well as drive gear 98. As a result, movement of movable member 32 causes a rotation of rake head 50 about drive axis 52 between its working configuration and dumping configuration and vice versa.

The aforementioned functionality is achieved in part by way of rack 60 which is fixed to fixed member 30 as shown. Indeed, rack 60 includes an arm 102 which is fixed to the exterior of fixed member 30 by way of a mount 104. Rack gear 106 is affixed to an end of arm 102 as shown. In the illustrated configuration shown in FIG. 4, i.e. the working configuration, it will be noted that rack gear 106 is only minimally in meshed contact with pinion gear 92. A locking arrangement 110 is less utilized to rotationally fix pinion gear 92 such that unwanted rotation of rake head 50 about drive axis 52 is prevented.

Figure 5:
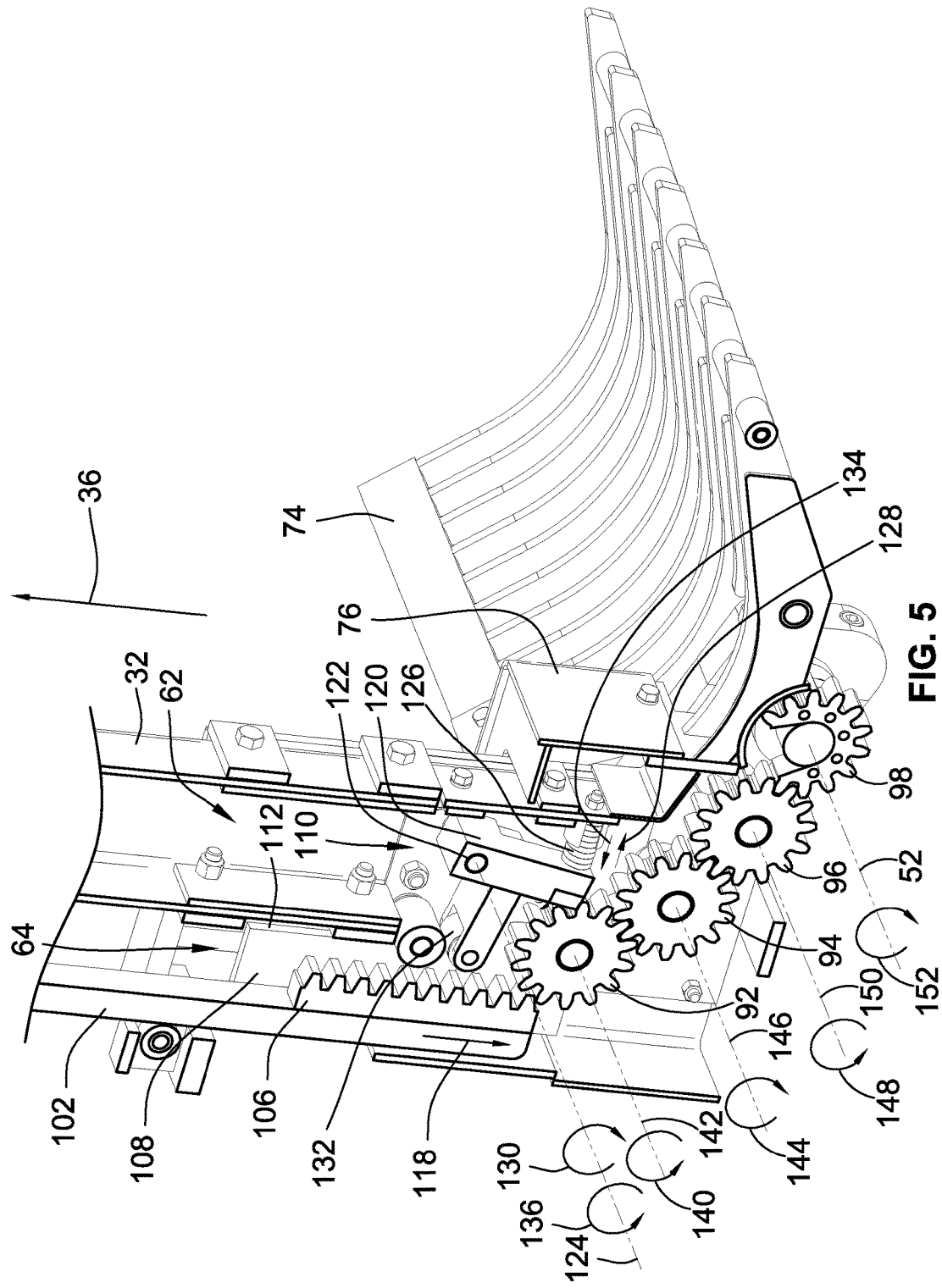
FIG. 5 is a side cross section of the rake head assembly of FIG. 2.

With particular reference now to FIG. 5, the same illustrates a perspective cross-section of drive arrangement 90. As can be seen therein, locking arrangement 110 includes a locking arm 120 which is rotatable about a pin 122 about a lock axis 124 in rotational directions 130, 136. A portion of locking arm 120 engages pinion gear 92 as shown to prevent rotation of pinion gear 92 in rotational direction 140 about pinion gear axis 142 which would otherwise occur due to the weight of rake head 50. A spring 126 biases locking arm 120 in linear direction 128 into contact with pinion gear 92 to thus lock the seam in place. However, rack 106 also includes a contact plate 108 which defines a contact surface 112. As rack 60 moves in linear direction 118 as a result of movable member 32 moving in linear direction 36, this contact surface 112 will be brought into contact with a roller 132 connected to an end of locking arm 120. This will cause a depression of spring 126 in linear direction 134 and also a rotation of locking arm about lock axis 124. Locking arm 120 is thus brought out of contact with pinion gear 92. Continued movement of rack 60 in linear direction 118 brings rack gear 106 into meshed contact with pinion gear 92. This causes a rotation of pinion gear 92 in rotational direction 140 about pinion gear axis 142.

The aforementioned rotation of pinion gear 92 causes a rotation of first intermediary gear 94 in rotational direction 144 about first intermediary axis 146. This in turn causes a rotation of second intermediary gear 96 in rotational direction 148 about second intermediary axis 150. The rotation of second intermediary gear 96 causes a corresponding rotation of drive gear 98 in rotational direction 152 about drive axis 52 which is coincident with drive axis 52 described above. It will be recognized that a reverse process is utilized to return rake head 50 from the dumping configuration to the working configuration. It will also be recognized that drive gear 98 has several teeth removed therefrom. This prevents unwanted over-travel of rake head 50 from the dumping configuration past its maximum angular travel to the working configuration.

Although not illustrated, linear and rotational sensors may also be utilized within drive arrangement 90 to ensure synchronicity of the aforementioned gears. In such a configuration, rake head assembly 50 may also include its own internal control for monitoring such sensors.

Figure 6:
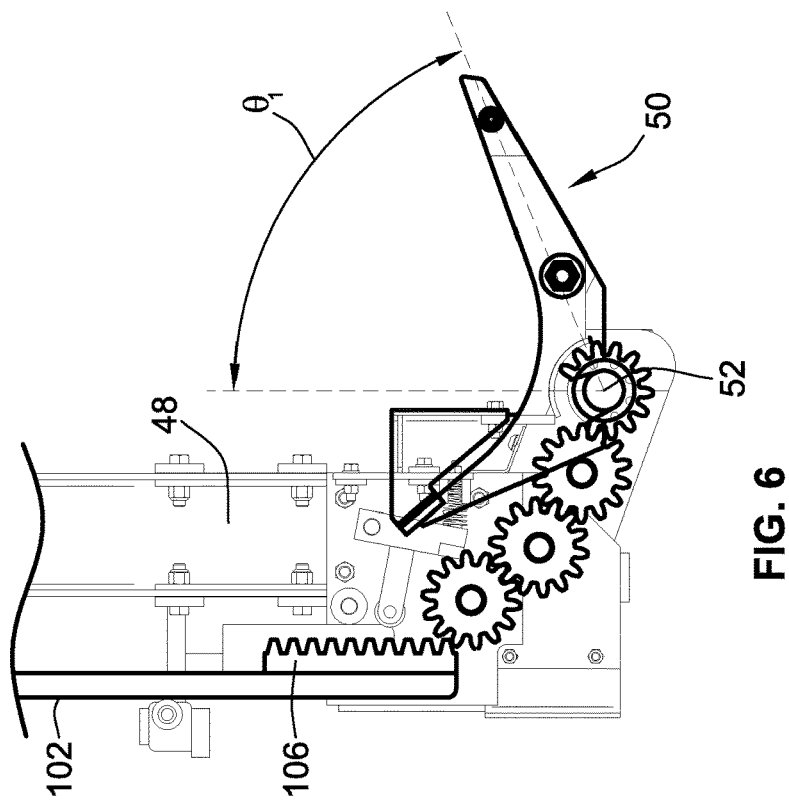

Turning now to FIGS. 6 and 7, the same respectively illustrates the working configuration and dumping configuration of rake head assembly 34. In particular reference to FIG. 6, in the working configuration, the tines of rake head 50 arranged at an angle $\Theta_1$ relative to a reference vertical axis. Turning now to FIG. 7, the tines of rake head 50 are arranged at an angle $\Theta_2$ relative to a reference vertical axis. In the exemplary embodiment illustrated, the angle $\Theta_1$ is approximately 70°, while the angle $\Theta_2$ is approximately 230°. As such, the angular displacement of rake head 50 about drive axis 52 approximately 160° and is significantly greater than existing designs.

This results in a significant reduction or elimination of the necessity for the manual removal of residual trash from rake head 50. It will also be recognized that with minor modifications to the arrangement of the gears of the drive arrangement, this angular displacement may be readily increased or decreased so as to accommodate any number of applications.

Yet further, although drive arrangement 90 is described above as incorporating a number of gears which includes a pinion gear in meshed contact with a rack gear 106, it is also contemplated by the invention herein, that a single gear may be utilized. Indeed, rack 60 may be arranged such that it engages a single gear which is mounted directly to drive shaft 78. Accordingly, it is contemplated that drive arrangement need only at least one gear for its effective operation to mesh with rack gear 106 of rack 60. Accordingly, in the illustrated embodiment, each of the gears of drive arrangement 90 are considered to be mechanically coupled to drive shaft 70 by way of the aforementioned meshed contact thereof, and by way of drive gear 98 being mounted directly to drive shaft 78. Additionally, it will be readily recognized that, because the drive arrangement 90 is partially exposed in the dumping configuration, trash trapped behind rake head 50 can be taken up by the gears of drive arrangement 90 and crushed. The same holds true for any icing on the gears. The mechanism is thus self-cleaning.

Although described in the context of a trash rake system, aspects of the invention also contemplate a retro fit rake head assembly as described herein. Indeed, rake head assembly 34 may be incorporated into any existing telescopic boom trash rake system with only the necessity of installing the aforementioned rack 62 a fixed member of such an existing telescopic boom assembly. Accordingly, while the invention may be embodied as an entire trash rake system, it may also be embodied as a stand-alone rake head assembly. In either case, those of skill in the art will readily recognize that the system described herein advantageously overcomes existing problems in the art by providing a rake head assembly with a high degree of articulation. Furthermore, this high degree of articulation is a result of a rack and pinion style mechanism as opposed to the conventionally employed hydraulics or other complex mechanisms would increase the cost, complexity, and potential contaminating effects of conventional trash rake systems. The above-described rack and pinion configuration elegantly takes advantage of the existing energy of the system through the movement of a telescoping boom assembly.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A rake head assembly for a trash rake system, the trash rake system having a main unit and a telescoping boom mounted to the main unit, the rake head assembly configured for mounting to an end of the telescoping boom, the rake head assembly comprising:
   a base frame;
   a rake head;
   a drive arrangement mounted to the base frame, the rake head mounted to the drive arrangement, the drive arrangement configured to rotate the rake head about a drive axis defined by a drive shaft of the drive arrangement between a working configuration and a dumping configuration;
   wherein the rake head is rotatable about the drive axis such that an angular displacement of the rake head about the drive axis moving from the working configuration to the dumping configuration is greater than ninety degrees;
   wherein the drive arrangement includes at least one gear mechanically coupled to the drive shaft.

2. The rake head assembly of claim 1, wherein the rake head includes a center member and a pair of side members, wherein the pair of side members are mounted to the drive shaft of the drive arrangement.

3. The rake head assembly of claim 2, wherein the side members and center member are supported by a plurality of support bars, the plurality of support bars arranged in a parallel configuration relative to the drive shaft.

4. The rake head assembly of claim 1, wherein the at least on gear includes a pinion gear, a first intermediary gear, a second intermediary gear, and a drive gear.

5. The rake head assembly of claim 4, wherein the pinion gear is in meshed contact with the first intermediary gear, the second intermediary gear is in meshed contact with the first intermediary gear, and the drive gear is in meshed contact with the second intermediary gear.

6. The rake head assembly of claim 5, wherein the pinion gear is positioned within an opening of the base frame such that it is arranged to mesh with a rack gear.

7. The rake head assembly of claim 1, further comprising a locking arrangement for locking the drive arrangement in a fixed position such that rotation of the rake head about the drive axis is prevented.

8. The rake head assembly of claim 7, wherein the locking arrangement includes a rotatable locking arm, wherein a portion of the rotatable locking arm is configured to selectively engage at least one gear of the drive arrangement.

9. A rake head assembly for a trash rake system, the trash rake system having a main unit and a telescoping boom mounted to the main unit, the rake head assembly configured for mounting to an end of the telescoping boom, the rake head assembly comprising:
   a base frame;
   a rake head;
   a drive arrangement mounted to the base frame, the rake head mounted to the drive arrangement, the drive arrangement configured to rotate the rake head about a drive axis defined by a drive shaft of the drive arrangement between a working configuration and a dumping configuration; and
   wherein the drive arrangement includes at least one gear mechanically coupled to the drive shaft such that rotation of the at least one gear results in rotation of the rake head about the drive axis.

10. The rake head assembly of claim 9, wherein the rake head is rotatable about the drive axis such that an angular displacement of the rake head about the drive axis moving from a working configuration to a dumping configuration is greater than ninety degrees.

11. The rake head assembly of claim 9, wherein the at least on gear includes a pinion gear, a first intermediary gear, a second intermediary gear, and a drive gear.

12. The rake head assembly of claim 11, wherein the pinion gear is in meshed contact with the first intermediary gear, the second intermediary gear is in meshed contact with the first intermediary gear, and the drive gear is in meshed contact with the second intermediary gear.

13. The rake head assembly of claim 12, wherein the pinion gear is positioned within an opening of the base frame such that it is arranged to mesh with a rack gear.

14. A trash rake system, the trash rake system comprising:
   a main unit;
   a telescoping boom mounted to the main unit, the telescoping boom including a fixed member and a movable member, the movable member received by the fixed member and movable relative thereto;
   a rake head assembly mounted to an end of the telescoping boom, wherein the rake head assembly includes a rake head rotatable about a drive axis, and wherein the rake head assembly includes a drive arrangement mechanically coupled to the rake head and configured for rotating the rake head about the drive axis;
   a rack mounted to the fixed member and extending into the rake head assembly, the rack including a rack gear, wherein movement of the movable member relative to the fixed member selectively couples and decouples the rack gear from the drive arrangement; and
   wherein the drive arrangement includes at least one gear in meshed contact with the rack gear.

15. The trash rake system of claim 14, wherein the at least one gear includes a pinion gear, a first intermediary gear, a second intermediary gear, and a drive gear, wherein the pinion gear is in meshed contact with the first intermediary gear, the second intermediary gear is in meshed contact with the first intermediary gear, and the drive gear is in meshed contact with the second intermediary gear, and wherein the pinion gear is in meshed contact with the rack gear.

16. The trash rake system of claim 14, wherein the rake head is rotatable about the drive axis such that an angular displacement of the rake head about the drive axis moving from a working configuration to a dumping configuration is greater than ninety degrees.

17. The trash rake system of claim 14, wherein the rake head is rotatable about the drive axis such that an angular displacement of the rake head about the drive axis moving from a working configuration to a dumping configuration is from one hundred twenty degrees to one hundred eighty degrees.

18. The trash rake system of claim 14, wherein the rake head assembly further comprises a locking arrangement for selectively preventing rotation of at least one gear of the drive arrangement.

* * * * *